United States Patent
Shamis et al.

(10) Patent No.: US 9,223,673 B1
(45) Date of Patent: Dec. 29, 2015

(54) CUSTOM HOST ERRORS DEFINITION SERVICE

(71) Applicant: Amazon Technologies, Inc., Seattle, WA (US)

(72) Inventors: Mark Shamis, Seattle, WA (US); Aaron Joseph Coon, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 229 days.

(21) Appl. No.: 13/858,636

(22) Filed: Apr. 8, 2013

(51) Int. Cl.
*G06F 11/00* (2006.01)
*G06F 11/32* (2006.01)
*G06F 11/07* (2006.01)
*H04L 12/24* (2006.01)

(52) U.S. Cl.
CPC .......... *G06F 11/327* (2013.01); *G06F 11/0781* (2013.01); *G06F 11/006* (2013.01); *H04L 41/50* (2013.01); *H04L 41/5067* (2013.01)

(58) Field of Classification Search
CPC .............. G06F 11/006; G06F 11/0751; G06F 11/0754; G06F 11/0781; G06F 11/2252; G06F 11/3006; G06F 11/301; G06F 11/327; G06F 2201/81; H04L 41/06; H04L 41/681; H04L 41/50; H04L 41/5003; H04L 41/5006; H04L 41/5067
See application file for complete search history.

(56) References Cited

U.S. PATENT DOCUMENTS

| | | | |
|---|---|---|---|
| 6,473,407 B1* | 10/2002 | Ditmer et al. | 370/252 |
| 8,499,331 B1* | 7/2013 | Yehuda et al. | 726/1 |
| 8,725,741 B2* | 5/2014 | Cohen et al. | 707/748 |
| 9,069,665 B2* | 6/2015 | Murphy | G06F 11/0709 |
| 2003/0101201 A1* | 5/2003 | Saylor et al. | 707/200 |
| 2003/0135382 A1* | 7/2003 | Marejka et al. | 705/1 |
| 2005/0278570 A1* | 12/2005 | Jastad et al. | 714/25 |
| 2006/0020699 A1* | 1/2006 | D'Esposito | 709/224 |
| 2007/0174716 A1* | 7/2007 | Erdtmann et al. | 714/39 |
| 2007/0174732 A1* | 7/2007 | Irby et al. | 714/47 |
| 2011/0276594 A1* | 11/2011 | Chong et al. | 707/769 |
| 2014/0188729 A1* | 7/2014 | Hong | 705/44 |
| 2015/0142967 A1* | 5/2015 | Lockhart | H04L 41/0681 709/224 |
| 2015/0172104 A1* | 6/2015 | Brandwine | H04L 69/40 709/224 |

* cited by examiner

*Primary Examiner* — Marc Duncan
(74) *Attorney, Agent, or Firm* — Lee & Hayes, PLLC; Charles L. Warner

(57) ABSTRACT

A custom host errors definition service is provided. The custom host errors definition service can create separate endpoints through which different customers can define custom host errors for one or more host computing systems, which might operate in a distributed execution environment. A custom host error definition can specify one or more host computing systems, one or more system components of the one or more host computing systems, one or more attributes, one or more error conditions for the one or more attributes, and one or more actions to perform as a result of the error conditions being satisfied. The error conditions can be, but are not limited to, threshold conditions, component failure conditions, missing hardware conditions, degraded hardware conditions, system firmware failures, incorrect firmware conditions, and the like.

13 Claims, 6 Drawing Sheets

CUSTOM HOST ERRORS DEFINITION SERVICE

BACKGROUND

Services exist that allow customers to receive periodic status updates from computing systems. A given status update might include a snapshot of the current status of one or more computing systems and their components (e.g., processors, hard drives, memory, and/or fans). These services might expose status update information to customers, and additionally tag error conditions, such as a fan not spinning fast enough to maintain a specified temperature of a hardware component. In this way, a customer can identify problems with computing systems and take steps to resolve the problems.

The definition of an "error" condition changes frequently at the request of multiple customers such that what one customer considers an error, another customer might not. For instance, one customer might have a very high tolerance for hard drive sector reallocations, while another customer might have a very low tolerance for hard drive sector reallocations. As a result, one customer might deem a certain status value as being within normal operating limits, whereas another customer might deem the same status value as being indicative of an error condition.

It is respect to these and other considerations that the disclosure made herein is presented.

DETAILED DESCRIPTION

The following detailed description is directed to providing a custom host errors definition service. The custom host errors definition service can create separate endpoints through which different customers can define custom host errors for one or more host computing systems, which might operate in a distributed execution environment. A custom host error definition can specify one or more host computing systems, one or more system components of the one or more host computing systems, one or more attributes, one or more error conditions for the one or more attributes, and one or more actions to perform as a result of the error conditions being satisfied. The error conditions can be, but are not limited to, threshold conditions, component failure conditions, missing hardware conditions, degraded hardware conditions, system firmware failures, incorrect firmware conditions, and the like.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
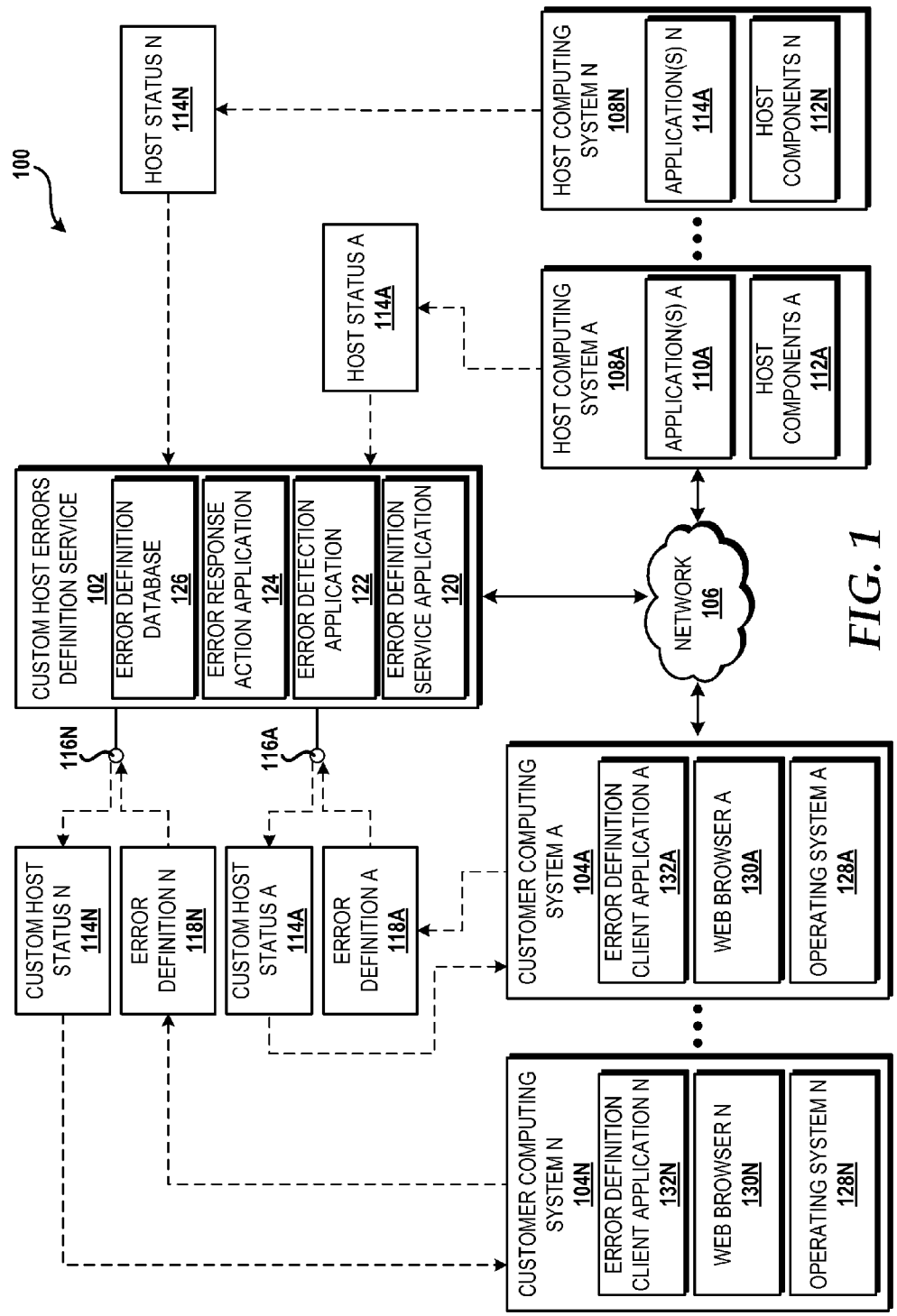
FIG. 1 is a system diagram showing an illustrative operating environment for the various embodiments disclosed herein.

FIG. 1 and the following description are intended to provide a brief, general description of a suitable computing environment in which the embodiments described herein may be implemented. In particular, FIG. 1 is a system and network diagram that shows an illustrative operating environment 100 including several hardware and software components for providing a custom host errors definition service 102. The operating environment 100 is merely illustrative and the embodiments disclosed herein might be utilized in many different types of environments.

The operating environment 100 shown in FIG. 1 includes customer computing systems 104A-104N (which may be referred to herein singularly as "the customer computing system 104" or in the plural as "the customer computing systems 104"). The customer computing systems 104 may be desktop or laptop personal computers, tablet computers, smartphones, personal digital assistants ("PDAs"), e-readers, game consoles, set-top boxes, server computers, or any other computing device capable of accessing the custom host errors definition service 102. The customer computing systems 104 might access the custom host errors definition service 102 over a suitable data communications network 106 ("network 106"), which may be a wide area network ("WAN"), local area network ("LAN"), metropolitan area network ("MAN"), other area network, a combination thereof, or the like.

The operating environment 100 also includes host computing systems 108A-108N (which may be referred to herein singularly as "the host computing system 108" or in the plural as "the host computing systems 108"). The host computing systems 108 may be desktop or laptop personal computers, tablet computers, smartphones, PDAs, e-readers, game consoles, set-top boxes, server computers, or any other computing device capable of hosting one or more host applications 110A-110N (which may be referred to herein singularly as "the host application 110" or in the plural as "the host applications 110") executing on the host computing systems 108. The host computing systems 108 also include one or more host components 112A-112N (which may be referred to herein singularly as "the host component 112" or in the plural as "the host components 112"). The host components 112 may include hardware components such as, but not limited to, processors, memory, optical drives, solid-state drives, hard drives, tape drives, system boards, motherboards, backplanes, fans, video cards, power supplies, heat sinks, cabling, chassis, peripherals, monitors, speakers, microphones, and the like.

The host computing systems 108 are configured to provide information regarding the operational status of one or more of the host components 112 to the custom host errors definition service 102 in the form of host statuses 114A-114N (which may be referred to herein singularly as "the host status 114" or in the plural as "the host statuses 114"). The host computing systems 108 may provide the host statuses 114 to the custom host errors definition service 102 on a periodic basis or upon request, for example, from one or more of the customer computing systems 104.

The host statuses 114 may provide snapshots of the current statuses of the host computing systems 108 and the associated host components 112. For example, the host status A 114A might provide the operational status of one or more fans operating within the host computing system A 108A. The custom host errors definition service 102 can utilize the host status A 114A to determine whether the operational status of the fans is within specification, or if not, to flag the fans as being in an error state, such as a failed or degraded state. What constitutes an error state for one or more of the host components 112 can be specified in one or more custom host error definitions provided by one or more customers of the custom host errors definition service 102, as will be described in greater detail below.

Figure 2:
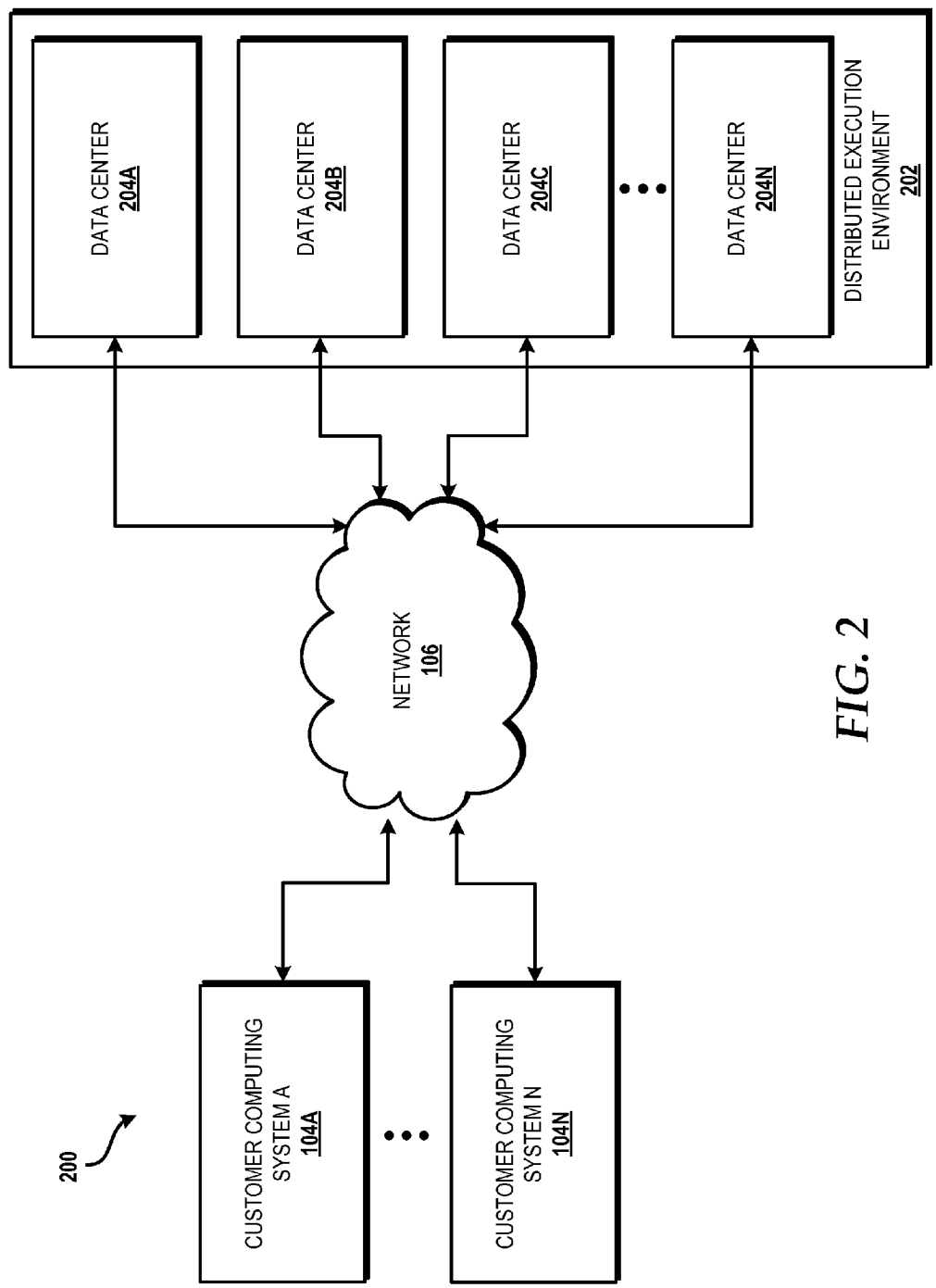
FIG. 2 is a system and network diagram that shows an illustrative operating environment that includes a distributed execution environment configured for providing a custom host errors definition service, according to one embodiment disclosed herein.
Figure 3:
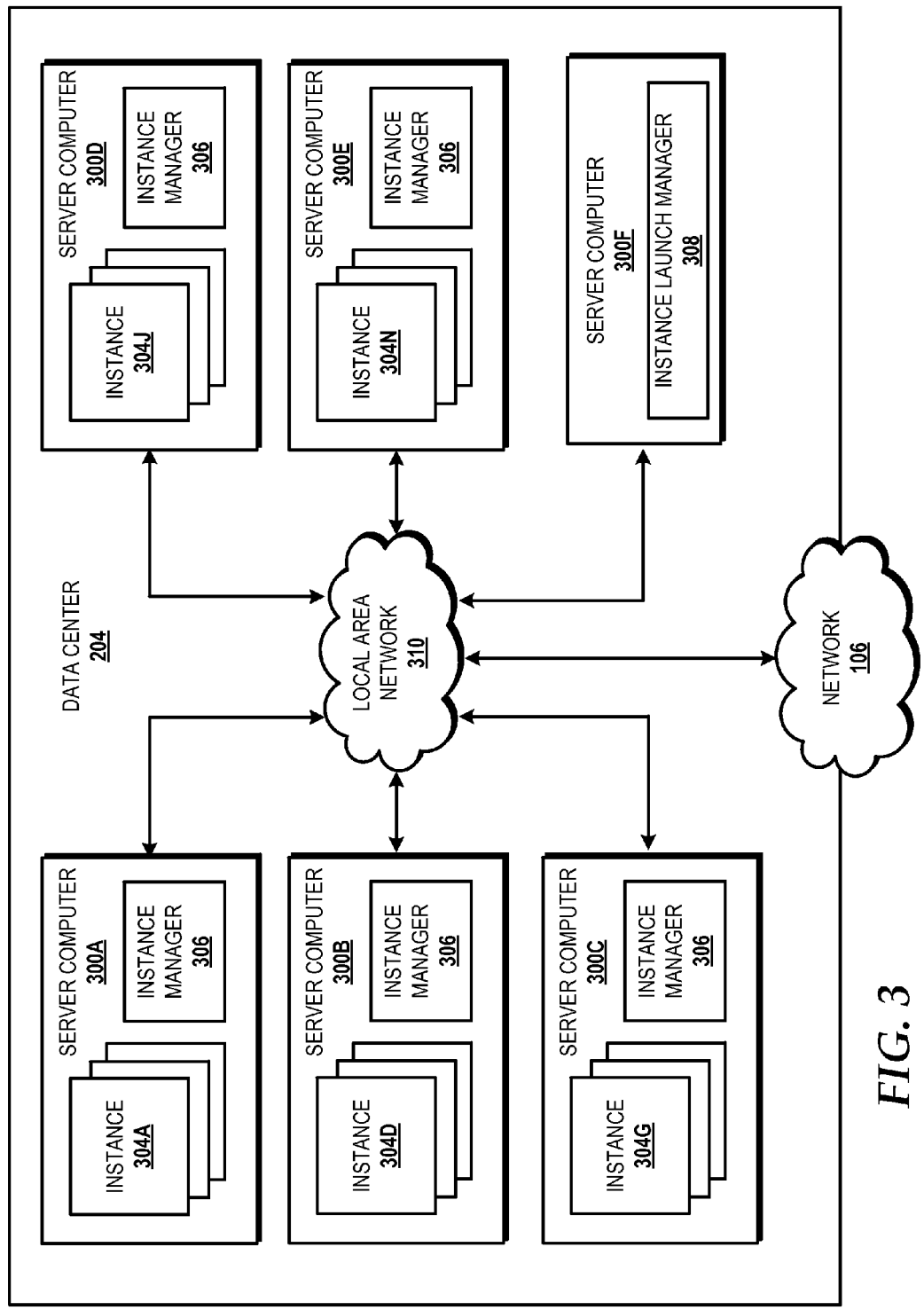
FIG. 3 is a computing system diagram that illustrates one configuration for a data center that implements aspects of the concepts and technologies disclosed herein for providing a custom host errors definition service, according to one embodiment disclosed herein.

In some embodiments, the host computing systems 108 are provided in a distributed execution environment (shown in FIGS. 2-3). A distributed execution environment allows customers to purchase and utilize instances of computing resources, such as virtual machine instances, on a permanent or as-needed basis. A distributed execution environment may offer instances of computing resources for purchase in various configurations. For example, a distributed execution environment might offer the virtual machine instances for purchase and use in many different configurations of processor capabilities, main memory, disk storage, operating system, other hardware, and other software. The distributed execution environment might also offer instances of other types of resources for purchase and use by customers. One or more instances may execute on each of the host computing systems 108. Additional details regarding an illustrative distributed execution environment will be described in greater detail below with regard to FIGS. 2-3.

As described above, customers may have different concerns regarding the operation of one or more of the host computing systems 108, the applications 110, and/or the host components 112. As a result, different customers might have different preferences with regard to what constitutes and what does not constitute an error in the operation of one or more of the host computing systems 108, the applications 110, and/or the host components 112. The custom host errors definition service 102 is configured to create and expose endpoints 116A-116N (which may be referred to herein singularly as "the endpoint 116" or in the plural as "the endpoints 116") for use by customers to define their own rules for what they consider to be an error.

As used herein, an "endpoint" can be used to indicate a specific network location through which one or more customers can access the custom host errors definition service 102 to define errors, to modify previously defined errors, to monitor the operational status of one or more of the host computing systems 108, and/or to perform other tasks. In some embodiments, each of the endpoints 116 is identified and accessible by way of a uniform resource indicator ("URI"). The endpoints 116 may be exposed by the custom host errors definition service 102 operating as a web service using hypertext transfer protocol ("HTTP"), HTTP Secure ("HTTPS"), and/or some other protocol. Moreover, the endpoints 116 may be created, controlled, and modified via one or more application programming interfaces ("APIs") or Web APIs exposed by or for the custom host errors definition service 102. In the illustrated embodiment, the custom host errors definition service 102 exposes the endpoints 116 so that customers can provide error definitions 118A-118N (which may be referred to herein singularly as "the error definition 116" or in the plural as "the endpoints 116") for use by the custom host errors definition service 102 to monitor the host statuses 114 for errors.

As used herein, an "error" can be a discrepancy between a computed, observed, or measured value or condition, and a known accepted value or condition. The known accepted value or condition may be an accepted value or condition of a set of accepted values or conditions, or a single accepted value or condition. The error conditions can be, for example, threshold conditions, component failure conditions, missing hardware conditions, degraded hardware conditions, system firmware failures, incorrect firmware conditions, and the like.

In some embodiments, the custom host errors service 102 provides one or more default error definitions. The default error definitions can be applied to one or more of the host computing systems 108 if a customer has not provided an error definition or at the request of the customer to utilize the default error definition. A default error definition can be created to meet some desired operation of one or more of the host computing systems 108. For example, a default error definition might be configured so as to achieve best performance, most reliability, or some other desired operation.

In some embodiments, the custom host errors service 102 provides one or more error definition templates. The error definition templates can be utilized by a customer as a starting point from which to create a custom host error definition. Templates may be provided based on certain components to be monitored, the desired strictness for monitoring, and other criteria.

In response to determining that an error exists based upon an error definition 118, the custom host errors definition service 102 can flag the error. In some embodiments, the custom host errors definition service 102 also notifies the customer(s) that provided the error definition 118. A notification might be an email, text message, telephone call, or other notification provided by a notification service. It is contemplated that the protocol (e.g., hypertext transfer protocol, email, short message service, or the like) to be used for notification may be identified via the error definition 118 or by other means. The notification service may be provided as a "push" service to the customer computing systems 104 and/or other devices available to the customer(s).

In some embodiments, the custom host errors definition service 102 can provide corrective actions to eliminate a detected error, to mitigate the error, or to otherwise take action in response to detection of the error, such a shutting down the host computing system 108 that caused the error. The corrective actions can be defined, for example, in the error definition 118 or by other means.

The custom host errors definition service 102 can be operated by one or more computing systems (not shown) that are configured to execute one or more application programs. In the illustrated embodiment, the custom host errors definition service 102 can be operated by one or more computing systems that are configured to execute an error definition service application 120, an error detection application 122, and an error response action application 124.

The error definition service application 120 can provide a web service to create the endpoints 116 and facilitate the input of the error definitions 118, among other tasks, such as allowing a previously submitted error definition to be modified. In some embodiments, the error definition service application 120 provides a user interface through which the error definitions 118 can be provided. An illustrative example of such an interface is described below with reference to FIG. 5. The error definition service application 120 may cause the error definitions 118 to be stored in an error definition database 126, which may store the error definitions 118 in association with the customer(s) that provided the error definitions 118.

The error detection application 122 can access the error definition database 126 to apply the error definitions 118 to the host statuses 114 received from one or more of the host computing systems 108 in order to detect errors in accordance with the error definitions 118. In response to detecting an error, the error detection application 122 can instruct the error response action application 124 to perform a corrective action to eliminate the error, to mitigate the error, or to otherwise take action in response to detection of the error.

The error definition service application 120, the error detection application 122, the error response action application 124, and the error definition database 126 are each illustrated as separate components of the custom host errors definition service 102, although other implementations that combine one or more of these components are contemplated. The error definition service application 120, the error detection application 122, the error response action application 124, and the error definition database 126 can execute on top of one or more operating systems (not shown).

The customer computing systems 104 each can execute an operating system 128 and one or more application programs, such as, for example, a web browser application 130 and an error definition client application 132. The operating systems 128 are computer programs for controlling the operation of the customer computing systems 104. According to one embodiment, the operating systems 128 include the LINUX operating system. According to another embodiment, the operating systems 128 include the WINDOWS® operating system from MICROSOFT Corporation. According to further embodiments, the operating systems 128 may include the UNIX or SOLARIS operating systems. It should be appreciated that other operating systems may also be utilized by the customer computing systems 104, including mobile operating systems for smartphones and/or tablet computer implementations of the customer computing systems 104. The application programs are executable programs configured to execute on top of the operating systems 128 to provide various functions.

The web browser applications 130 are application programs through which a user/customer can access information resources on the web via a network, such as the network 106. In some embodiments, the web browser applications 130 allow a user to access a website hosted by or for the customer host errors definition service 102 and accessible via one or more of the endpoints 116. The website may provide a web-based graphical user interface through which a user can create error definitions, modify existing error definitions, and otherwise interact with the custom host errors definition 102. An example of such an interface is described below with reference to FIG. 5.

The error definition client applications 132 are application programs through which the customer computing systems 104 can connect to the custom host errors definition service 102 to create and manage error definitions. As such, the error definition client applications 132 may be native applications configured to connect to the endpoints 116 as an alternative to a customer using a web interface provided through the web browsers 130. The error definition client applications 132 might also facilitate account creation, account management, and/or other tasks to be performed via the custom host errors definition service 102.

FIG. 2 and the following description are intended to provide a brief, general description of a suitable computing environment in which the embodiments described herein may be implemented. In particular, FIG. 2 is a system and network diagram that shows an illustrative operating environment 200 that includes a distributed execution environment 202 configured for providing access to the custom host errors definition service 102, according to one embodiment disclosed herein.

The distributed execution environment 202 can provide instances of computing resources on a permanent or an as-needed basis. The instances of computing resources provided by the distributed execution environment 202 may include various types of resources, such as data processing resources, data storage resources, data communication resources, and the like. The resources may be provided at least in part by the host computing systems 108. Each type of computing resource may be general-purpose or may be available in a number of specific configurations. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

Instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Instances of remote desktop sessions might also be utilized in various embodiments presented herein. A remote desktop session may be established utilizing the remote desktop protocol ("RDP") or another similar protocol for viewing and interacting with a graphical user interface provided by another computer. It should be understood that an instance may include any combination of the various types of resources described above.

The instances of computing resources provided by the distributed execution environment 202 are enabled in one implementation by one or more data centers 204A-204N (which may be referred herein singularly as "a data center 204" or in the plural as "the data centers 204"). The data centers 204 are facilities utilized to house and operate computer systems and associated components. The data centers 204 typically include redundant and backup power, communications, cooling, and security systems. The data centers 204 might also be located in geographically disparate locations.

One illustrative configuration for a data center 204 that implements the concepts and technologies disclosed herein for providing the custom host errors definition service 102 will be described below with regard to FIG. 3.

The customers and other consumers of the distributed execution environment 202 may access the computing resources provided by the data centers 204 over a network, such as the network 106, the Internet, or any other networking topology known in the art that connects the data centers 204 to remote customers and/or other users may be utilized. It should also be appreciated that combinations of such networks might also be utilized.

FIG. 3 is a computing system diagram that illustrates one configuration for a data center 204 that can be used to implement the distributed execution environment 202, including the concepts and technologies disclosed herein for providing the custom host errors definition service 102. The example data center 204 shown in FIG. 3 includes several server computers 300A-300F (which may be referred herein singularly as "the server computer 300" or in the plural as "the server computers 300") for providing instances of computing resources. The server computers 300 may be standard tower or rack-mount server computers configured appropriately for providing the computing resources described herein. For example, in one implementation the server computers 300 are configured to provide instances 304A-304N of computing resources.

In one embodiment, the instances 304A-304N (which may be referred herein singularly as "the instance 304" or in the plural as "the instances 304") are virtual machine instances. As known in the art, a virtual machine instance is an instance of a software implementation of a machine (e.g., a computer) that executes programs like a physical machine. Each of the servers 300 may be configured to execute an instance manager 306 capable of instantiating and managing instances of computing resources. In the case of virtual machine instances, for example, the instance manager 306 might be a hypervisor or another type of program configured to enable the execution of multiple virtual machine instances 304 on a single server computer 300, for example. It should be appreciated that although the embodiments shown in FIG. 3 are described primarily in the context of virtual machine instances, other types of instances of computing resources can be utilized with the concepts and technologies disclosed herein.

The data center 204 also includes a server computer 300F reserved for executing software components for managing the operation of the data center 204, the server computers 300, and the instances 304. In particular, the server computer 300F might execute the instance launch manager 308 to receive instance launch requests from one or more of the customer computing systems 104, and to instantiate one or more of the instances 304 in response to the requests.

In the example data center 204, an appropriate LAN 310 is utilized to interconnect the server computers 300A-300E and the server computer 300F. The LAN 310 is also connected to the network 106, which was introduced in FIG. 1. It should be appreciated that the network topology illustrated in FIGS. 1-3 has been greatly simplified and that many more networks and networking devices may be utilized to interconnect the various computing systems disclosed herein. Appropriate load balancing devices or software modules might also be utilized for balancing a load between each of the data centers 204A-204N, between each of the server computers 300A-300F in each data center 204, and between instances 304 of computing resources purchased by each customer of the distributed execution environment 202.

It should be appreciated that the data center 204 described in FIG. 3 is merely illustrative and that other implementations might be utilized. In particular, functionality described herein as being performed by the instance launch manager 308 might be performed by one or more other components. Additionally, it should be appreciated that the functionality provided by these components might be implemented in software, hardware, or a combination of software and hardware. Other implementations should be apparent to those skilled in the art.

The host computing systems 108 (described in FIG. 1) might be implemented as part of the server computers 300 within the data center 204. The host applications 114 (also described in FIG. 1) might include the instance manager 306, the instance launch manager 308, and/or other applications executing on virtual instances within the distributed computing environment 202.

Figure 4:
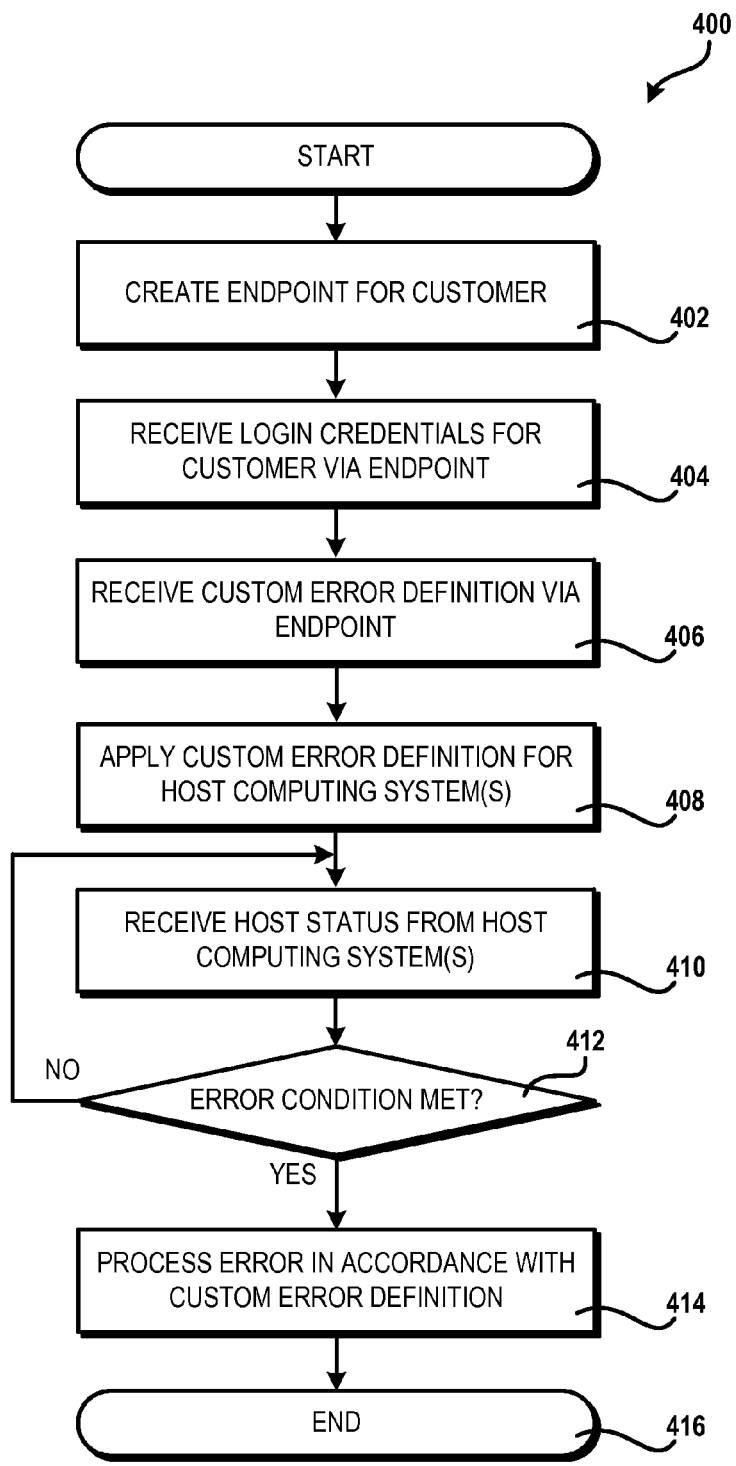
FIG. 4 is a flow diagram showing aspects of a method for providing a custom host errors definition service, according to an illustrative embodiment.

Turning now to FIG. 4, aspects of a method 400 for providing a custom host errors definition service, such as the custom host errors definition service 102 described above with regard to FIG. 1, will be described in detail, according to an illustrative embodiment. It should be appreciated that the logical operations described herein with respect to FIG. 4 are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in FIG. 4 and described herein. These operations may also be performed in parallel, or in a different order than those described herein.

For purposes of illustrating and describing the concepts of the present disclosure, the methods disclosed herein are described as being performed by one of more computing systems configured to provide the custom host errors service 102 via execution of one or more software modules such as, for example, the error definition service application 120, the error detection application 122, and/or the error response action application 124. It should be understood that additional and/or alternative devices and/or network nodes can provide the functionality described herein via execution of one or more modules, applications, and/or other software including, but not limited to, the error definition service application 120, the error detection application 122, and the error response action application 124. Thus, the illustrated embodiments are illustrative, and should not be viewed as being limiting in any way.

The method 400 begins at operation 402, where the custom host errors definition service 102 creates an endpoint, such as one of the endpoints 116, for a customer. From operation 402, the method 400 proceeds to operation 404, where the custom host errors definition service 102 receives login credentials for the customer. The login credentials might include a username and password combination and/or any other authentication credential so as to provide the customer secure access to the custom host errors definition service 102 via the endpoint. In some embodiments, the login credentials are associated with an account established by or on behalf of the customer to access the custom host errors definition service 102. The account also might be associated with other services, such as one or more services provided at least in part by the distributed execution environment 202.

Figure 5:
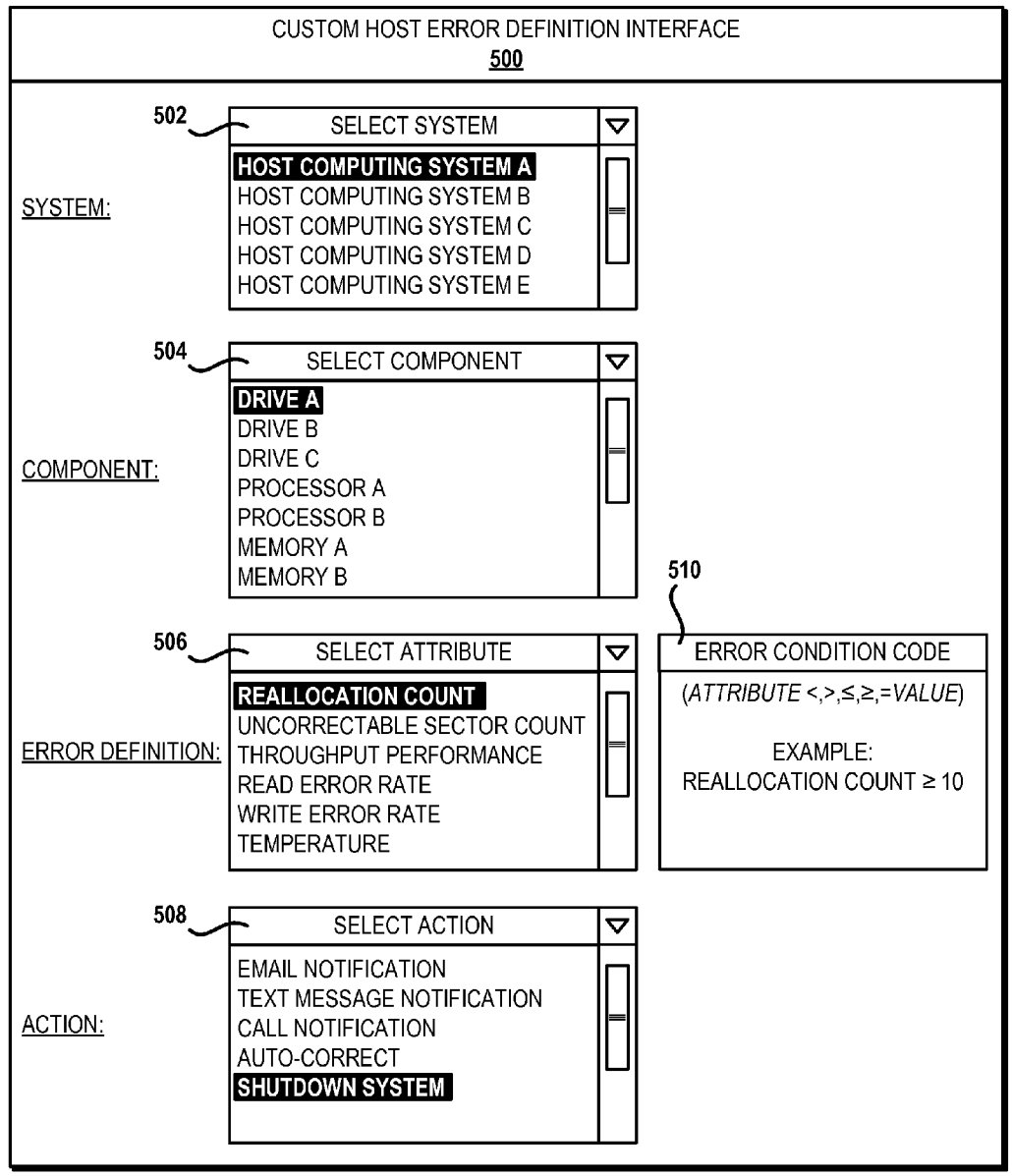
FIG. 5 is a user interface diagram showing aspects of a custom host error definition interface, according to an illustrative embodiment.

From operation 404, the method 400 proceeds to operation 406, where the custom host errors definition service 102 receives a custom error definition, such as one of the error definitions 118, via the endpoint created at operation 402. The custom error definition can be provided by one or more customers via a web interface provided by the endpoint. An illustrative custom host error definition interface 500 is illustrated in FIG. 5, which will now be described.

The custom host error definition interface 500 is provided as merely one example of an interface that might be utilized to facilitate receipt of custom host error definitions by the custom host errors definition service 102, such as described at operation 406 of the method 400 illustrated in FIG. 4. It is contemplated, however, that other interface types using any user interface elements might be utilized to provide an interface for use by one or more customers to define one or more custom host errors for the custom host errors definition service 102. As such, the illustrated custom host error definition interface 500 is merely provided as an example, and should not be construed as being limiting in any way.

The custom host error definition interface 500 provides multiple drop-down menus for use by customers to provide custom error definitions. The illustrated custom host error definition interface 500 has a system selection menu 502, a component selection menu 504, an attribute selection menu 506, an action selection menu 508, and an error condition code entry element 510. Although the menus 502-508 are shown as drop-down menus, other user interface elements such as, for example, text boxes, buttons, lists, check boxes, radio buttons, tabs, icons, and the like may be utilized in alternative implementations.

The system selection menu 502 provides a number of host computing systems that may be selected as the system(s) for which the custom error definition should be applied. In the illustrated example, "HOST COMPUTING SYSTEM A" has been selected to identify that the host computing system A 108A is the host computing system for which the custom error definition should be applied.

The component selection menu 504 provides a number of components that may be selected as the component(s) for which the custom error definition should be applied. In the illustrated example, "DRIVE A" has been selected to identify that a drive component, such as a hard drive, is the component of the host components A 112A of the host computing system A 108A for which the custom error definition should be applied.

The attribute selection menu 506 provides a number of attributes that may be selected as the attribute(s) for use in creating the custom error condition. The attributes provided in the attribute selection menu 506 may be particular to the selected component. In the illustrated example, the attribute selection menu 506 includes a plurality of attributes that are particular to the operation of "DRIVE A," and more generally, to hard drive components. The example attributes include reallocation count, uncorrectable sector count, throughput performance, read error rate, write error rate, and temperature. These examples are merely illustrative of some types of attributes that may be monitored for a hard drive component. Other components might have different attributes. A processor, for example, might have attributes relating to clock speed, temperature, and the like. A solid-state drive, on the other hand, might have attributes similar to a hard drive for read error rates, write error rates, and temperature, for example.

The error condition for an attribute selected via the attribute selection menu 506 can be defined via the error condition code entry element 510. In some embodiments, the error condition code entry element 510 can be a text box configured to receive code for programming the error condition for the selected attribute. The language utilized to code the error condition for the selected attribute might be any existing programming language, a proprietary programming language, or rules defined through the use of symbols such as a less-than sign ("<"), a greater-than sign (">"), a less-than-or-equal-to sign ("≤"), a greater-than-or-equal-to sign ("≥"), and an equal-to sign ("="). For example, the error condition code for the selected "REALLOCATION COUNT" attribute might include "REALLOCATION COUNT≥10" to define any reallocation count that is greater-than-or-equal-to the value "10" for "DRIVE A" on "HOST COMPUTING SYSTEM A" as being indicative of an error and flag the error accordingly.

The action selection menu 508 provides a number of actions that can be taken by the custom host errors definition service 102 in response to detecting the error defined through the other selection menus 508-506 and the error condition code entry element 510. In the illustrated example, the action selection menu 508 includes an email notification, a text message notification, a call notification, an auto-correct action, and a shutdown system action. The notification actions can be used to notify one or more customers that created the custom error definition of the error. The auto-correct action can cause the custom host errors definition service 102 to auto-correct the error. This might entail having one or more individuals manually replace a defective part, such as "DRIVE A," run one or more diagnostic tests, run one or more applications in an attempt to resolve the error, and/or take other action on behalf of the customer(s). The shutdown system action has been selected in the illustrated example, and as a result, the custom host errors definition service 102 can cause the "HOST COMPUTING SYSTEM A" to be shutdown. Additional actions may then be taken by or on behalf of the customer(s) to resolve the error, and as such, the examples provided above should not be construed as being limiting in any way.

Turning back to FIG. 4, after a custom error definition is received, such as via the custom host error definition interface 500, the method 400 proceeds from operation 406 to operation 408, where the custom host errors definition service 102 applies the custom error definition for the selected system(s). From operation 408, the method 400 proceeds to operation 410, where the custom host errors definition service 102 receives a host status (e.g., the host status 114) from the selected system(s).

At operation 412, the custom host errors definition service 102 analyses the host status to determine whether an error condition provided in the custom error definition has been met. If not, the method 400 proceeds back to operation 410, where the custom host errors definition service 102 receives another host status. If so, the method 400 proceeds to operation 414, where the custom host errors definition service 102 processes the error in accordance with the custom error definition. The custom host errors definition service 102 may process the error by taking one or more actions defined in the custom error definition. A default action, such as to notify the customer, may be taken in lieu of a customer-defined action to take in response to the error.

From operation 414, the method 400 proceeds to operation 416. The method 400 ends at operation 416.

Figure 6:
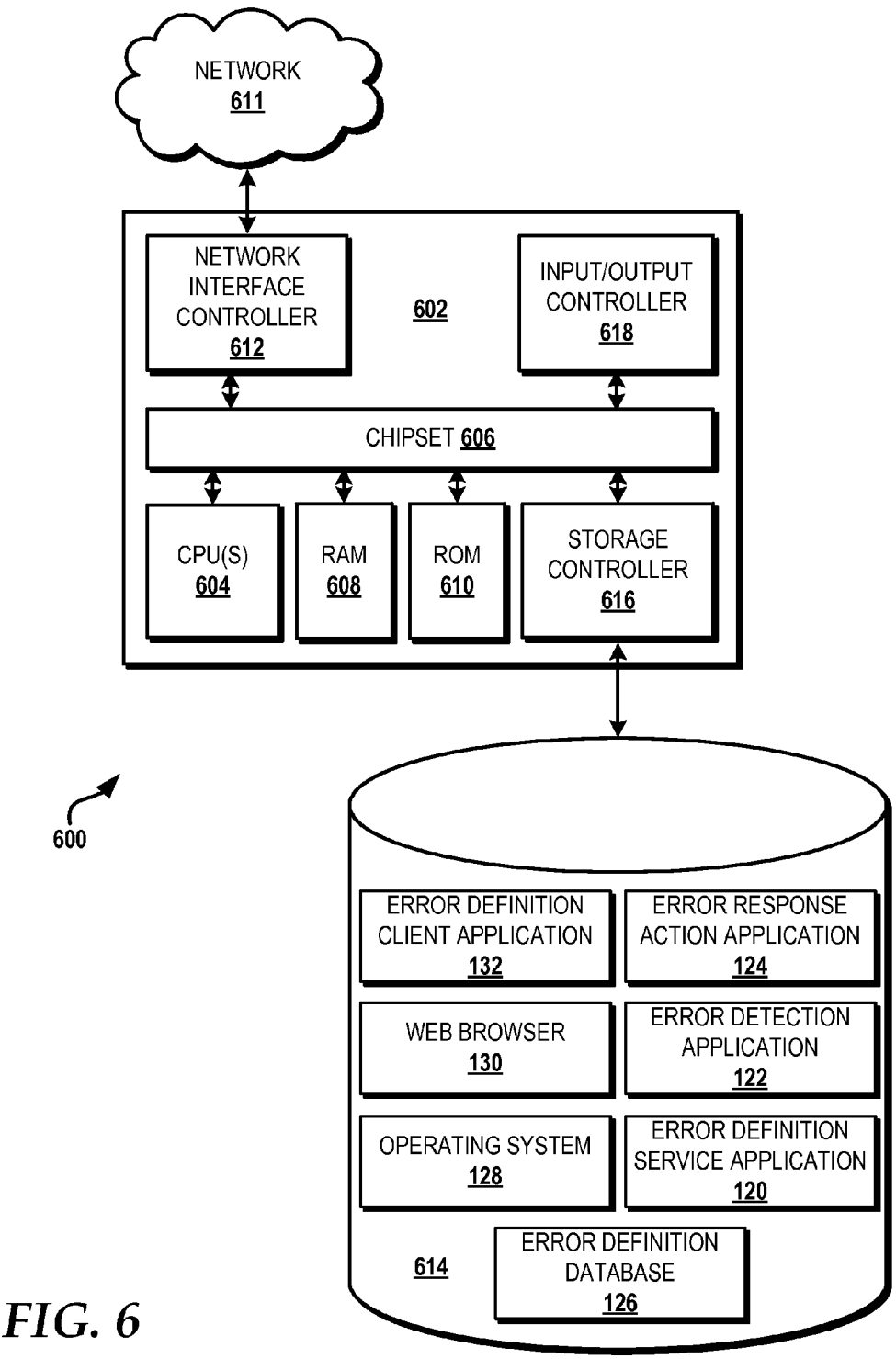
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing the program components described above for providing a custom host errors definition service. The computer architecture shown in FIG. 6 illustrates a conventional server computer, workstation, desktop computer, laptop, tablet, network appliance, PDA, e-reader, digital cellular phone, or other computing device, and may be utilized to execute any aspects of the software components presented herein described as executing on the customer computing systems 104, on the host computing systems 108, on computing systems utilized by the custom host errors definition service 102, within the data centers 204A-204N, on the server computers 300A-300F, or on any other computing system mentioned herein.

The computer 600 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a random access memory ("RAM") 608, used as the main memory in the computer 600. The chipset 606 may further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM may also store other software components necessary for the operation of the computer 600 in accordance with the embodiments described herein.

The computer 600 may operate in a networked environment using logical connections to remote computing devices and computer systems through a network 611, such as the network 106 or the local area network 310. The chipset 606 may include functionality for providing network connectivity through a network interface controller ("NIC") 612, such as a gigabit Ethernet adapter. The NIC 612 is capable of connecting the computer 600 to other computing devices over the network 611. It should be appreciated that multiple NICs 612 may be present in the computer 600, connecting the computer to other types of networks and remote computer systems.

The computer 600 may be connected to a mass storage device 614 that provides non-volatile storage for the computer. The mass storage device 614 may store system programs, application programs, other program modules, and data, which have been described in greater detail herein. The mass storage device 614 may be connected to the computer 600 through a storage controller 616 connected to the chipset 606. The mass storage device 614 may consist of one or more physical storage units. The storage controller 616 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 614 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 614 is characterized as primary or secondary storage, and the like.

For example, the computer 600 may store information to the mass storage device 614 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 614 by detecting the physical states or characteristics of one or more particular locations within the physical storage units.

In addition to the mass storage device 614 described above, the computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 614 may store an operating system, such as the operating system 128, utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 614 may store other system or application programs and data utilized by the computer 600, such as the error definition client application 132, the web browser 130, the error response action application 124, the error detection application 122, the error definition service application 120, the error definition database 126, and/or any of the other software components and data described herein above. The mass storage device 614 might also store other programs and data not specifically identified herein.

In one embodiment, the mass storage device 614 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the method described above with regard to FIG. 4 and to present a user interface, such as the custom host error definition interface 500 described above with regard to FIG. 5.

The computer 600 may also include one or more input/output controllers 618 for receiving and processing input from a number of input devices, such as a keyboard, a mouse, a touchpad, a touch screen, an electronic stylus, or other type of input device. Similarly, the input/output controller 618 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing a custom host errors definition service have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a custom host errors definition service, the computer-implemented method comprising performing computer-implemented operations for:
   presenting, via a web service endpoint, a user interface through which a custom host error for a host computing system is defined, the host computing system being one of a plurality of host computing systems which are interconnected via one or more networks;
   receiving, via the user interface, a custom host error definition for the custom host error by receiving an identification of the host computing system, an identification of a component of the identified host computing system, an identification of an attribute of the identified component, and an identification of a code that defines an error condition relating to the identified component;
   receiving a host status from the host computing system;
   analyzing the host status to determine that the error condition has been met; and
   taking a predetermined action in response to a determination that the error condition has been met.

2. The computer-implemented method of claim 1, wherein the host computing system is operating within a distributed execution environment.

3. The computer-implemented method of claim 1, wherein the web service endpoint is exposed via a web application programming interface.

4. The computer-implemented method of claim 1, wherein taking a predetermined action comprises notifying a customer that the error condition has been met.

5. The computer-implemented method of claim 1, wherein taking a predetermined action comprises performing a corrective action to at least reduce the custom host error.

6. A computer-readable storage medium having computer-executable instructions stored thereon which, when executed by a computer, cause the computer to:
   receive, via a first endpoint, a definition of a first custom host error for a first host computing system of a plurality of host computing systems which are interconnected via one or more networks, by receiving an identification of the first host computing system, an identification of a first component of the identified host computing system, an identification of an attribute of the identified first component, and an identification of a first code that defines an error condition relating to the identified first component;
   receive, via a second endpoint, a definition of a second custom host error for a second host computing system of the plurality of host computing systems by receiving an identification of the second host computing system, an identification of a second component of the identified second host computing system, an identification of an attribute of the identified second component, and an identification of a second code that defines an error condition relating to the identified second component;
   monitor a host status received from the first host computing system and a host status received from the second host computing system to determine that the first custom host error or the second custom host error has occurred;
   send a first error notification and shut down the first host computing system in response to a determination that the first custom host error has occurred; and to
   send a second notification error and shut down the second host computing system in response to a determination that the second custom host error has occurred.

7. The computer-readable storage medium of claim 6, wherein the first endpoint is accessible via a first uniform resource identifier and the second endpoint is accessible via a second uniform resource identifier.

8. The computer-readable storage medium of claim 6, wherein at least one of the first host computing system or the second host computing system is operating within a distributed execution environment.

9. The computer-readable storage medium of claim 6, wherein to send a first error notification and to send a second error notification each comprises utilizing a notification service to generate the first error notification and the second error notification, respectively.

10. An apparatus configured to provide a custom host errors definition service, the apparatus comprising:
    at least one processor; and
    a computer-readable storage medium having computer-executable instructions stored thereon which, when executed on the at least one processor, cause the apparatus to:

receive, via a first endpoint exposed by the apparatus, a definition of a first custom host error for a host computing system of a plurality of host computing systems which are interconnected via one or more networks, by receiving an identification of the host computing system, an identification of a first component of the host computing system, an identification of an attribute of the identified first component, and an identification of a first code that defines an error condition relating to the identified first component;

receive, via a second endpoint exposed by the apparatus, a second custom host error for the host computing system by receiving an identification of a second component of the host computing system, an identification of an attribute of the identified second component, and an identification of a second code that defines an error condition relating to the identified second component;

monitor host statuses received from the host computing system to determine that the first custom host error or the second custom host error has occurred;

take a first predetermined action to correct the first custom host error in response to a determination that at least one of the host statuses indicates that the first custom host error has occurred; and take a second predetermined action to correct the second custom host error in response to a determination that at least one of the host statuses indicates that the second custom host error has occurred.

11. The apparatus of claim 10, wherein the computer-executable instructions further cause the apparatus to notify a customer that the first custom host error has been detected.

12. The apparatus of claim 10, wherein to take a first predetermined action to correct the first custom host error comprises sending a notification to replace the identified first component.

13. The apparatus of claim 10, wherein to take a first predetermined action to correct the first custom host error comprises sending a notification to run a predetermined application.

* * * * *